US012665790B2

(12) United States Patent
Paltin et al.

(10) Patent No.: US 12,665,790 B2
(45) Date of Patent: Jun. 23, 2026

(54) WINDOWING IN CHANNEL ESTIMATION

(71) Applicant: Dell Products L.P., Round Rock, TX (US)

(72) Inventors: Evgeny Paltin, Montreal (CA); Gwenael Poitau, Montreal (CA); Hamidreza Farmanbar, Ottawa (CA); Eran Goldstein, Montreal (CA)

(73) Assignee: Dell Products L.P., Round Rock, TX (US)

( * ) Notice: Subject to any disclaimer, the term of this patent is extended or adjusted under 35 U.S.C. 154(b) by 15 days.

(21) Appl. No.: 18/804,645

(22) Filed: Aug. 14, 2024

(65) Prior Publication Data

US 2026/0052044 A1     Feb. 19, 2026

(51) Int. Cl.
*H04L 25/02*          (2006.01)

(52) U.S. Cl.
CPC ........ *H04L 25/024* (2013.01); *H04L 25/0212* (2013.01)

(58) Field of Classification Search
CPC ..... H04B 1/709; H04B 1/7093; H04B 1/7115
USPC ....... 375/142–144, 148, 150, 152, 260, 267, 375/343; 370/208, 210, 344
See application file for complete search history.

(56) References Cited

U.S. PATENT DOCUMENTS

| | | | | |
|---|---|---|---|---|
| 2021/0321221 A1* | 10/2021 | Yerramalli | ............ | H04W 4/029 |
| 2022/0376957 A1* | 11/2022 | Song | ................... | H04L 25/0254 |
| 2023/0261910 A1* | 8/2023 | Andrews | ................. | H04B 1/40 |
| | | | | 375/262 |
| 2023/0300006 A1* | 9/2023 | Abdallah | .............. | H04L 25/022 |
| | | | | 375/267 |
| 2024/0364562 A1* | 10/2024 | Mohammadi | ....... | H04L 25/0232 |
| 2024/0396767 A1* | 11/2024 | Chen | ................... | H04L 25/0254 |

* cited by examiner

*Primary Examiner* — Young T. Tse
(74) *Attorney, Agent, or Firm* — Amin, Turocy & Watson, LLP

(57)          ABSTRACT

A system can input a group of correlation vectors to a trained machine learning model, wherein a number of correlation vectors of the group of correlation vectors corresponds to a number of antennas of a group of antennas, and wherein respective correlation vectors of the group of correlation vectors comprise respective least squares channel estimations that are processed by respective inverse fast Fourier transforms and that correspond to respective antennas of the group of antennas. The system can, as a result of the inputting, obtain an output of the trained machine learning model, wherein the output identifies a window size, a window position, and a window shape. The system can conduct broadband cellular communications with at least one user equipment based on the window size, the window position, and the window shape.

20 Claims, 12 Drawing Sheets

900

902

INPUTTING A GROUP OF CORRELATION VECTORS TO A TRAINED MACHINE LEARNING MODEL, WHEREIN A NUMBER OF CORRELATION VECTORS OF THE GROUP OF CORRELATION VECTORS CORRESPONDS TO A NUMBER OF ANTENNAS OF A GROUP OF ANTENNAS, AND WHEREIN RESPECTIVE CORRELATION VECTORS OF THE GROUP OF CORRELATION VECTORS COMPRISE RESPECTIVE LEAST SQUARES CHANNEL ESTIMATIONS THAT ARE PROCESSED BY RESPECTIVE INVERSE FAST FOURIER TRANSFORMS AND THAT CORRESPOND TO RESPECTIVE ANTENNAS OF THE GROUP OF ANTENNAS 904

AS A RESULT OF THE INPUTTING, OBTAINING AN OUTPUT OF THE TRAINED MACHINE LEARNING MODEL, WHEREIN THE OUTPUT IDENTIFIES A WINDOW SIZE, A WINDOW POSITION, AND A WINDOW SHAPE 906

CONDUCTING BROADBAND CELLULAR COMMUNICATIONS WITH AT LEAST ONE USER EQUIPMENT BASED ON THE WINDOW SIZE, THE WINDOW POSITION, AND THE WINDOW SHAPE 908

910

100
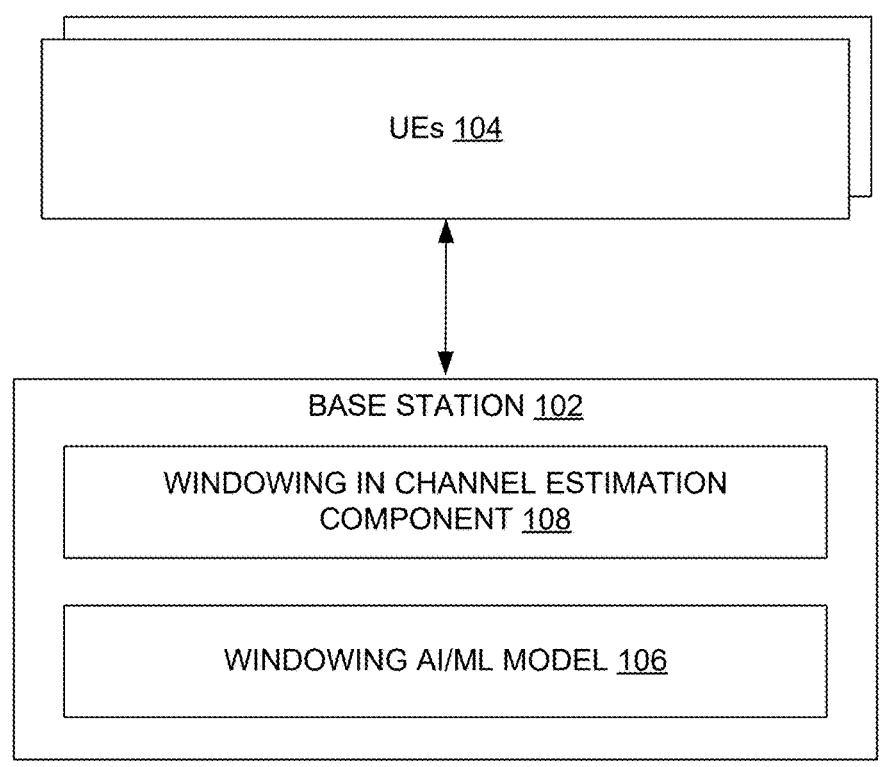
UEs 104
BASE STATION 102
WINDOWING IN CHANNEL ESTIMATION
COMPONENT 108
WINDOWING AI/ML MODEL 106
FIG. 1

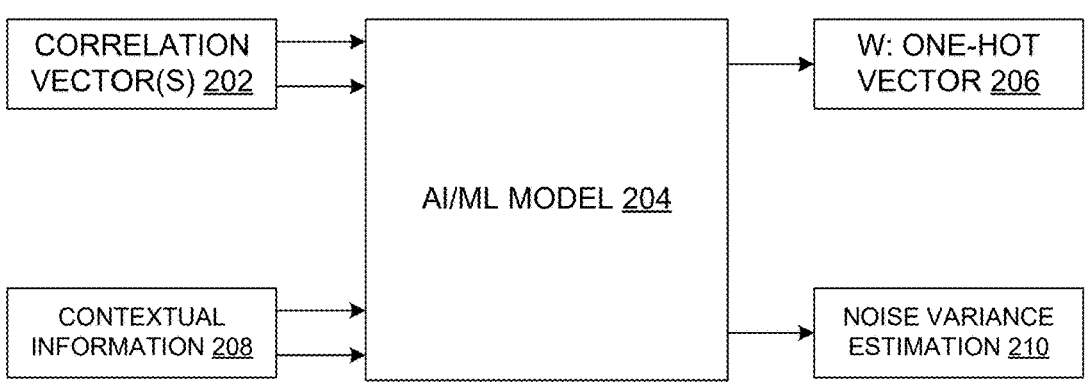
FIG. 2

300
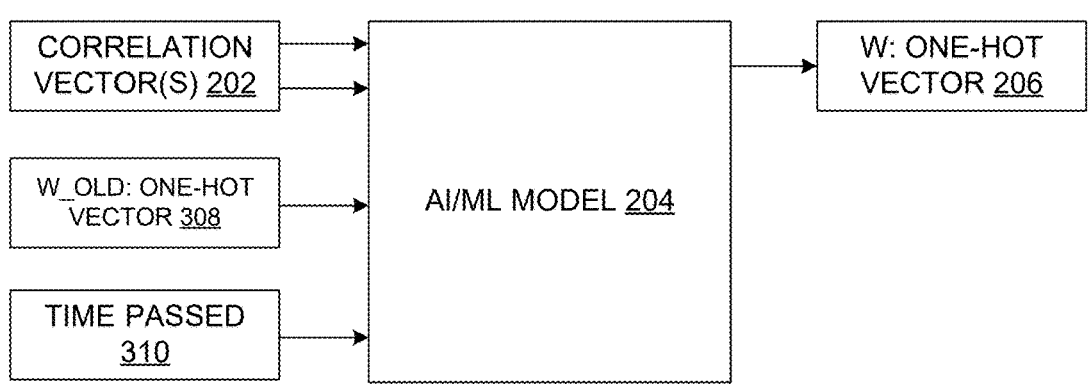
CORRELATION VECTOR(S) 202
W_OLD: ONE-HOT VECTOR 308
TIME PASSED 310
AI/ML MODEL 204
W: ONE-HOT VECTOR 206
FIG. 3

400

<u>500</u>

900

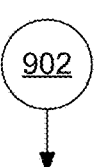

902

INPUTTING A GROUP OF CORRELATION VECTORS TO A TRAINED MACHINE LEARNING MODEL, WHEREIN A NUMBER OF CORRELATION VECTORS OF THE GROUP OF CORRELATION VECTORS CORRESPONDS TO A NUMBER OF ANTENNAS OF A GROUP OF ANTENNAS, AND WHEREIN RESPECTIVE CORRELATION VECTORS OF THE GROUP OF CORRELATION VECTORS COMPRISE RESPECTIVE LEAST SQUARES CHANNEL ESTIMATIONS THAT ARE PROCESSED BY RESPECTIVE INVERSE FAST FOURIER TRANSFORMS AND THAT CORRESPOND TO RESPECTIVE ANTENNAS OF THE GROUP OF ANTENNAS 904

AS A RESULT OF THE INPUTTING, OBTAINING AN OUTPUT OF THE TRAINED MACHINE LEARNING MODEL, WHEREIN THE OUTPUT IDENTIFIES A WINDOW SIZE, A WINDOW POSITION, AND A WINDOW SHAPE 906

CONDUCTING BROADBAND CELLULAR COMMUNICATIONS WITH AT LEAST ONE USER EQUIPMENT BASED ON THE WINDOW SIZE, THE WINDOW POSITION, AND THE WINDOW SHAPE 908

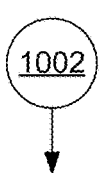

1002

AS PART OF FACILITATING BROADBAND CELLULAR COMMUNICATIONS WITH AT LEAST ONE USER EQUIPMENT USING A GROUP OF ANTENNAS, PROCESSING A GROUP OF CORRELATION VECTORS WITH A TRAINED MACHINE LEARNING MODEL TO PRODUCE AN OUTPUT, WHEREIN A NUMBER OF CORRELATION VECTORS OF THE GROUP OF CORRELATION VECTORS CORRESPONDS TO A NUMBER OF ANTENNAS OF THE GROUP OF ANTENNAS, WHEREIN RESPECTIVE CORRELATION VECTORS OF THE GROUP OF CORRELATION VECTORS COMPRISE RESPECTIVE LEAST SQUARES CHANNEL ESTIMATIONS THAT ARE PROCESSED BY RESPECTIVE INVERSE FAST FOURIER TRANSFORMS AND THAT CORRESPOND TO RESPECTIVE ANTENNAS OF THE GROUP OF ANTENNAS, AND WHEREIN THE OUTPUT IDENTIFIES A WINDOW CONFIGURATION 1004

FACILITATING THE BROADBAND CELLULAR COMMUNICATIONS WITH THE USER EQUIPMENT BASED ON THE WINDOW CONFIGURATION 1006

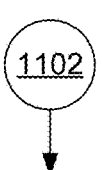

1102

AS PART OF BROADBAND CELLULAR COMMUNICATIONS WITH AT LEAST ONE USER EQUIPMENT USING ANTENNAS OF THE SYSTEM, INPUTTING CORRELATION VECTORS TO A TRAINED MACHINE LEARNING MODEL TO PRODUCE AN OUTPUT, WHEREIN RESPECTIVE CORRELATION VECTORS OF THE CORRELATION VECTORS COMPRISE RESPECTIVE LEAST SQUARES CHANNEL ESTIMATIONS THAT CORRESPOND TO RESPECTIVE ANTENNAS OF THE ANTENNAS, AND WHEREIN THE OUTPUT IDENTIFIES A WINDOW CONFIGURATION 1104

CONDUCTING THE BROADBAND CELLULAR COMMUNICATIONS WITH THE USER EQUIPMENT BASED ON IN ACCORDANCE WITH THE WINDOW CONFIGURATION 1106

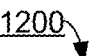
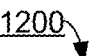
FIG. 12

WINDOWING IN CHANNEL ESTIMATION

BACKGROUND

Broadband cellular networks can facilitate network communications with user equipment (UE).

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can input a group of correlation vectors to a trained machine learning model, wherein a number of correlation vectors of the group of correlation vectors corresponds to a number of antennas of a group of antennas, and wherein respective correlation vectors of the group of correlation vectors comprise respective least squares channel estimations that are processed by respective inverse fast Fourier transforms and that correspond to respective antennas of the group of antennas. The system can, as a result of the inputting, obtain an output of the trained machine learning model, wherein the output identifies a window size, a window position, and a window shape. The system can conduct broadband cellular communications with at least one user equipment based on the window size, the window position, and the window shape.

An example method can comprise, as part of facilitating broadband cellular communications with at least one user equipment using a group of antennas, processing, by a system comprising at least one processor, a group of correlation vectors with a trained machine learning model to produce an output, wherein a number of correlation vectors of the group of correlation vectors corresponds to a number of antennas of the group of antennas, wherein respective correlation vectors of the group of correlation vectors comprise respective least squares channel estimations that are processed by respective inverse fast Fourier transforms and that correspond to respective antennas of the group of antennas, and wherein the output identifies a window configuration. The method can further comprise facilitating, by the system, the broadband cellular communications with the user equipment based on the window configuration.

An example non-transitory computer-readable medium can comprise instructions that, in response to execution, cause a system comprising a processor to perform operations. These operations can comprise as part of broadband cellular communications with at least one user equipment using antennas of the system, inputting correlation vectors to a trained machine learning model to produce an output, wherein respective correlation vectors of the correlation vectors comprise respective least squares channel estimations that correspond to respective antennas of the antennas, and wherein the output identifies a window configuration. These operations can further comprise conducting the broadband cellular communications with the user equipment based on in accordance with the window configuration.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 1 illustrates an example system architecture that can facilitate windowing in channel estimation, in accordance with an embodiment of this disclosure;

FIG. 2 illustrates an example system architecture for an artificial intelligence/machine learning (AI/ML) model that can facilitate windowing in channel estimation, in accordance with an embodiment of this disclosure;

FIG. 3 illustrates another example system architecture for an AI/ML model that can facilitate windowing in channel estimation, in accordance with an embodiment of this disclosure;

FIG. 9 illustrates an example process flow that can facilitate windowing in channel estimation, in accordance with an embodiment of this disclosure;

FIG. 10 illustrates another example process flow that can facilitate windowing in channel estimation, in accordance with an embodiment of this disclosure;

FIG. 11 illustrates another example process flow that can facilitate windowing in channel estimation, in accordance with an embodiment of this disclosure; and FIG. 12 illustrates an example block diagram of a computer operable to execute an embodiment of this disclosure.

DETAILED DESCRIPTION

Overview

Figure 4:
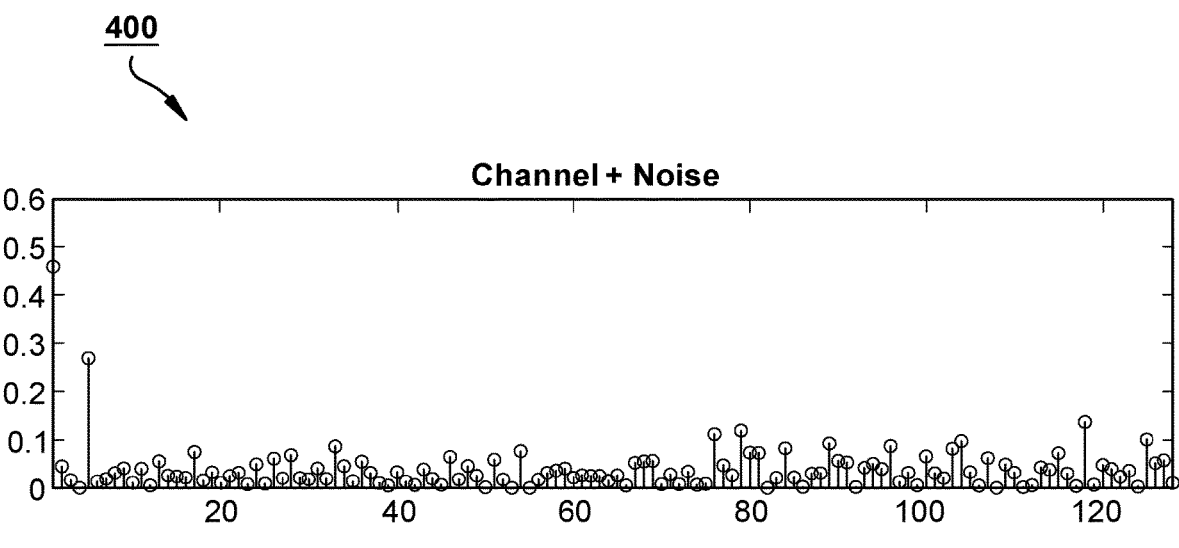
FIG. 4 illustrates an example correlation that can be input into a channel estimation component, and that can facilitate windowing in channel estimation, in accordance with an embodiment of this disclosure.

A baseline channel estimation scheme that can be employed in orthogonal frequency division multiplexing (OFDM) systems can comprise two consecutive stages:

1. Least square (LS), which can take a form of a match filter (MF) on the pilot occupied sub-carriers.

2. Noise filtering in delay/time domain.

Consider an example that utilizes a basic single input single output (SISO) configuration using the following assumptions:

Signal model at the receiver at sub-carrier level: y=hp+n

Pilot signal is normalized: $|p|^2=1$

In these equations, y represents a received signal, h represents a channel, p represents a pilot, and n represents noise.

The LS channel estimation is:

$$\hat{H}_{LS} = yp^* = (hp + n)p^* = h|p|^2 + np^* = h + \tilde{n}$$

3 where ñ has the same distribution as n.

After a channel has been estimated at pilot positions, a next step can be an inverse discrete Fourier transform (IDFT) moving to a delay domain, producing a raw channel taps estimation.

In OFDM systems, it can be that the DMRS signal is sparse in the frequency domain, implying that the channel spectrum is down sampled, and resulting in a reduced resolution in the delay domain. In case of a single carrier OFDM (which can be referred to as a single carrier frequency division multiple access (SC-FDMA) or discrete Fourier transform spread OFDM (DFT-S-OFDM)), the demodulation reference signal (DMRS) can be continuous in frequency, resulting in a native OFDM sampling rate-based resolution in the delay domain.

By using a maximal channel delay spread assumption, and by considering non-ideal timing synchronization, a window can be applied around the channel taps (via a multiplication operation), discarding all the samples beyond assuming them being populated mostly with noise. A rectangular window can be used that does not modify the preserved samples.

A variation can utilize a non-rectangular window that features a non-zero "transition band," enabling smoother transition between passband and stopband. When applied on correlation samples, this approach can partially suppress values on the edges. An idea behind this approach can be to reduce weight of samples that may contain channel information at lower probability, since the window is static and there can be a need to perform on average across various conditions.

In practical implementations, the window can be set statically to try and cover a wide range of expected conditions. As a result, typically the window can start at a negative offset to take into account weaker taps arriving before the main tap, which can characterize non-line of sight (NLOS) channels.

Before moving back to the frequency domain, in a case of sparse DMRS, the sequence can be zero padded to match the frequency domain width, which after IDFT, can result in perfect interpolation. Eventually, a DFT operation can transform back to the frequency domain, which can result in partially denoised channel estimation for all sub-carriers including those not carrying DMRS. The denoising can be partial since the noise inside the filter window is being preserved.

There can be problems with these prior approaches. As described in this baseline channel estimation scheme, above, the filtering window can be set statically to try to cover over a wide range of expected conditions using typical assumptions on channel delay, signal synchronization and taps spread preceding the main tap. The applied assumptions can be conservative, trying mainly to avoid channel taps corruption, since it can be that removing a channel tap can have a more devastating effect than allowing a moderate amount of additional noise in. To address these problems, the present techniques can facilitate dynamically adjusting this trade-off to better match the actual experienced conditions.

Channel conditions can change over time, manifesting in varying tap delays, delay spread and signal to noise ratio (SNR). As a result, it can be that the static window is not optimally chosen, leading to channel estimation degradation. In contrast, the present techniques can utilize artificial intelligence/machine learning (AI/ML) based control to dynamically decide on the optimal window size, position and shape to better cater to the experienced channel conditions.

While the present examples generally relate to an optimal window size, it can be appreciated that they can be applied to determining a window size that is not optimal, but that still satisfies an optimality criterion (e.g., it is within 1% of being optimal).

In practical implementations, there can be multiple factors impacting the optimal choice of the window configuration, such as:

Signal arrival timing can impact observed tap delays and the desired window position as a result.

Channel delay spread can impact window size. In LOS conditions, the strongest tap can be expected to be first, while in NLOS conditions, there can be a high probability of receiving weaker taps before the strongest tap. That can lead to window extension into a negative delay range.

Channel taps distribution characteristics that can impact the choice of a window shape.

SNR can impact the optimal window size trade-off decision balancing between channel taps preservation and amount of non-filtered noise admitted under the window.

The actual channel bandwidth can be wider than the sampled channel based on pilot frequency locations resulting in a "leakage" phenomena. This can manifest itself in channel information populating the full sequence length, rather than being limited to a maximal channel delay spread. This can mean that even in hypothetical infinite SNR conditions, all samples have non-zero contribution to channel estimation. In practice, because of the noise, below a certain SNR ratio at sample level, those samples can introduce more degradation than benefit to channel estimation. To mitigate that, it can be that, beyond a certain delay where channel taps contribution fades away, samples can be discarded/filtered. However, a challenge can lie in determining where the optimal trade-off is met, and which samples are better discarded. For example, given the same channel taps but in different SNR conditions, the optimal window width can be different reflecting a change in the optimal trade-off. At lower SNR, the optimum can shift towards a narrower window around main taps filtering more noise and even potentially weak taps. At higher SNR, the optimum can shift towards a wider window to take advantage of the weaker taps without introducing too much noise.

Example Architectures, Process Flows, and Tables

FIG. 1 illustrates an example system architecture 100 that can facilitate windowing in channel estimation, in accordance with an embodiment of this disclosure.

System architecture 100 comprises base station 102 and UEs 104. In turn, base station 102 comprises windowing AI/ML model 106 and windowing in channel estimation component 108.

Each of base station 102 and/or UEs 104 can be implemented with part(s) of computing environment 1200 of FIG. 12.

Windowing in channel estimation component 108 can utilize windowing AI/ML model 106 in determining a windowing size for broadband cellular communications between base station 102 and at least one UE of UEs 104.

In some examples, windowing in channel estimation component 108 can implement part(s) of the process flows of FIGS. 9-11 to facilitate windowing in channel estimation.

It can be appreciated that system architecture 100 is one example system architecture for windowing in channel estimation, and that there can be other system architectures that facilitate windowing in channel estimation.

FIG. 2 illustrates an example system architecture 200 for an artificial intelligence/machine learning (AI/ML) model that can facilitate windowing in channel estimation, in accordance with an embodiment of this disclosure. In some examples, part(s) of system architecture 200 can be used by part(s) of system architecture 100 of FIG. 1 to facilitate windowing in channel estimation.

System architecture 200 comprises correlation vector(s) 202, AI/ML model 204, W: one-hot vector 206, contextual information 208, and noise variance estimation 210.

Figure 5:
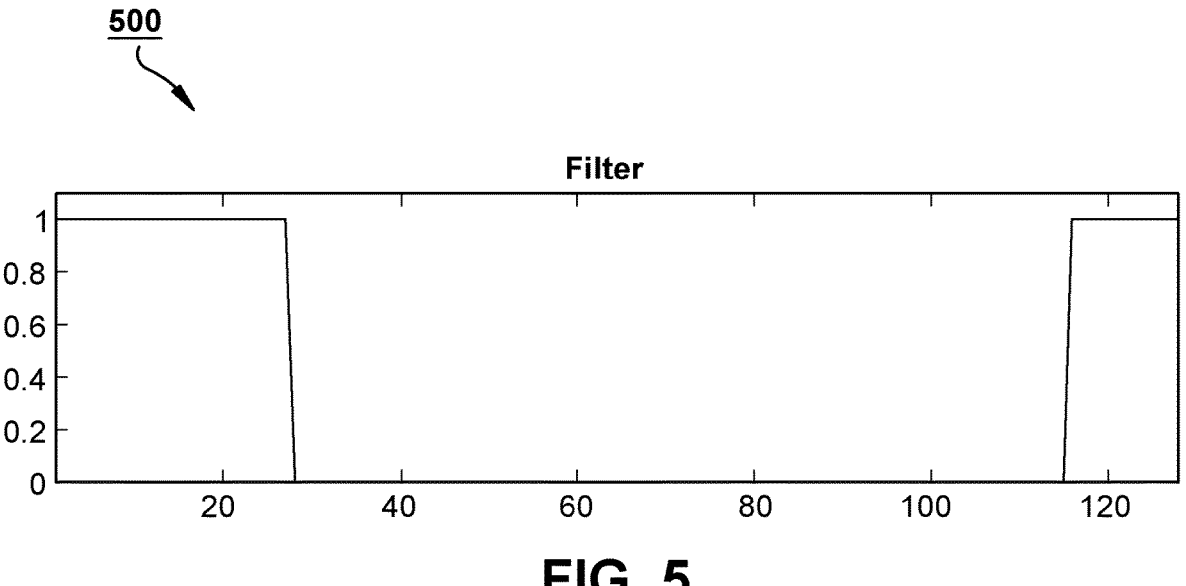
FIG. 5 illustrates an example window configuration that can facilitate windowing in channel estimation, in accordance with an embodiment of this disclosure.

In some examples, the present techniques can be formulated as a classification problem for a general multiple-input and multiple-output (MIMO) system, as shown in FIG. 5.

In an example AI/ML model, the model input can be:

N correlation vectors, where N is the number of transmission-reception (Tx-Rx) links. A correlation vector can be an output from least squares (LS) followed by inverse fast Fourier transform (IFFT).

In some examples, optional contextual information can include:

Last used window configuration

Time elapsed since this channel was observed last time

Noise variance estimation

Channel LOS/NLOS classification

Synchronization accuracy

Channel profile such as: micro/macro cell, urban/rural area, carrier frequency

In an example AI/ML model, the model output can be:

Preferred window configuration index out of finite set of possibilities representing a triplet of the following parameters:

S: window shape index

W: window size

P: window position

The index encoded in one-hot vector.

Refined noise variance estimation (which can be optional).

This example AI/ML model can find a best window configuration (e.g., shape, width, and position/offset) for the given input, minimizing total channel estimation mean square error (MSE) over all Tx-Rx links. At a system level, it can be that implementing this example AI/ML model does not require full overhaul of the system, enabling a smooth route for an existing systems upgrade.

It can be that the contextual information available to the model can differ significantly between different physical layer implementations. It can range from no contextual information, leaving the model working with correlations only, to various possible combinations of context parameters.

For dataset generation, channel knowledge can be used. In some examples, this channel knowledge can be generated using a digital twin. In some examples, the label for each data point can be determined as follows:

Apply filtering using all predefined window configurations.

Calculate channel estimation MSE for all window configurations.

Assign label representing window configuration that minimizes MSE.

In contrast to prior approaches, the present techniques can utilize AI/ML for dynamic window configuration. Such an AI/ML model can utilize small signal properties while accounting for contextual information to arrive at a window configuration that caters to a given channel instance/realization.

FIG. 3 illustrates another example system architecture 300 for an AI/ML model that can facilitate windowing in channel estimation, in accordance with an embodiment of this disclosure. In some examples, part(s) of system architecture 300 can be used by part(s) of system architecture 100 of FIG. 1 to facilitate windowing in channel estimation.

System architecture 300 comprises correlation vector(s) 302, AI/ML model 304, W: one-hot vector 306, W_old: one-hot vector 308, and time passed 310.

Consider the following examples, which are simplified to focus on the described properties. These examples use the following assumptions:

Only rectangular windows are considered.

The chosen sequence length is 128 with taps spreading ~25% of the sequence length. It can be that it is not typical under $3^{rd}$ Generation Partnership Project (3GPP) standards with cyclic prefix (CP) of ~7%, which can be expected to contain channel spread.

There is a simplified signal without artifacts associated with real implementation:

Limited channel sampling bandwidth

Sampling timing misalignment to the channel taps

Figure 6:
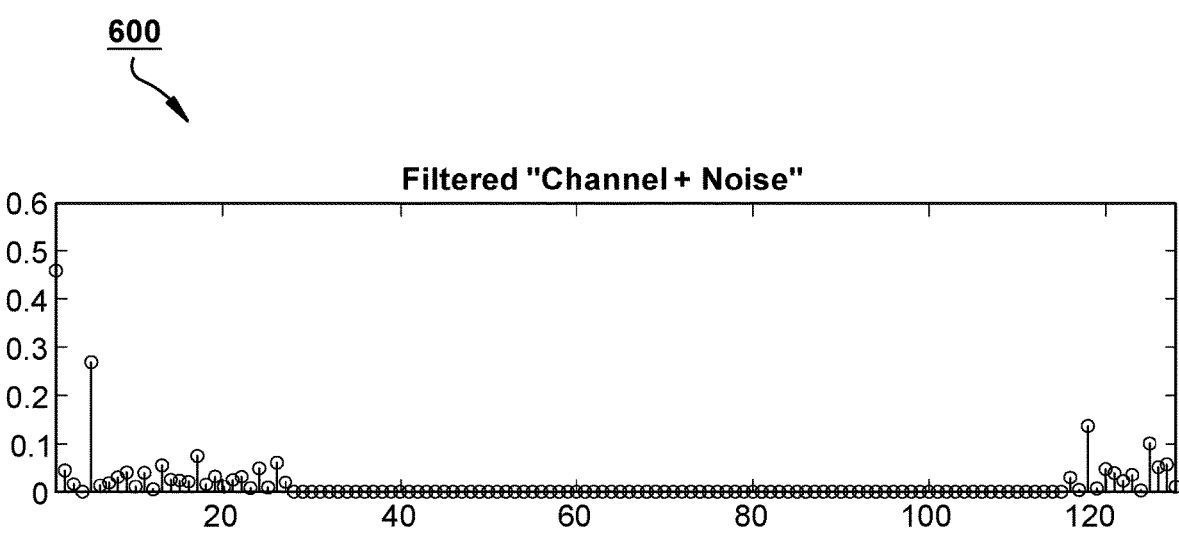
FIG. 6 illustrates an example filtering result in a delay domain that can facilitate windowing in channel estimation, in accordance with an embodiment of this disclosure.

A first example relates to a SISO system in NLOS conditions. There can be a SISO system with contextual information, comprising previously used window configuration and how much time has passed since then. The model inputs and outputs are shown in FIG. 6. In the one-hot vector, the "on" bit indicates the chosen window configuration.

FIG. 4 illustrates an example correlation 400 that can be input into a channel estimation component, and that can facilitate windowing in channel estimation, in accordance with an embodiment of this disclosure. In some examples, part(s) of correlation 400 can be used by part(s) of system architecture 100 of FIG. 1 to facilitate windowing in channel estimation.

In FIGS. 4-8, the x-axis can represent delay while the y-axis can represent an absolute of correlation values in a case of samples.

In NLOS conditions, it can be that the first tap is weaker than the main tap arriving later. And where the system is synchronized to the strongest tap or some kind of "center of mass" of all taps, the first tap can be expected to be offset to the left (negative) from "zero" timing appearing on the right extreme of the correlation due to a circular nature of a digital domain. This can be observed in the input correlation example in FIG. 4.

FIG. 5 illustrates an example window configuration 500 that can facilitate windowing in channel estimation, in accordance with an embodiment of this disclosure. In some examples, part(s) of window configuration 500 can be used by part(s) of system architecture 100 of FIG. 1 to facilitate windowing in channel estimation.

FIG. 5 shows a window which configuration is returned by the model (hypothetically) provided the input correlation vector shown in FIG. 4. This is a rectangular window having length of 40 and starting at offset −13. The negative offset can seek to include a weak tap preceding the main tap to which the system is synchronized. FIG. 6 shows a filtering result in a delay domain.

To demonstrate a potential gain of a dynamic window, assume that the static window would also be rectangular, but wider and start "earlier." For example, (W,P)=(60,−20). A choice of window of size 40 reduces propagated noise by ⅓, which, assuming that the channel is not compromised, improves channel estimation SNR by −10 log 10(40/60) =~1.76 decibels (dB)/.

FIG. 6 illustrates an example 600 of a filtering result in a delay domain that can facilitate windowing in channel estimation, in accordance with an embodiment of this disclosure. In some examples, part(s) of example 600 can be used by part(s) of system architecture 100 of FIG. 1 to facilitate windowing in channel estimation.

The example of FIG. 6 depicts a filtered correlation with a rectangular window (W,P)=(40,−13).

Figure 7:
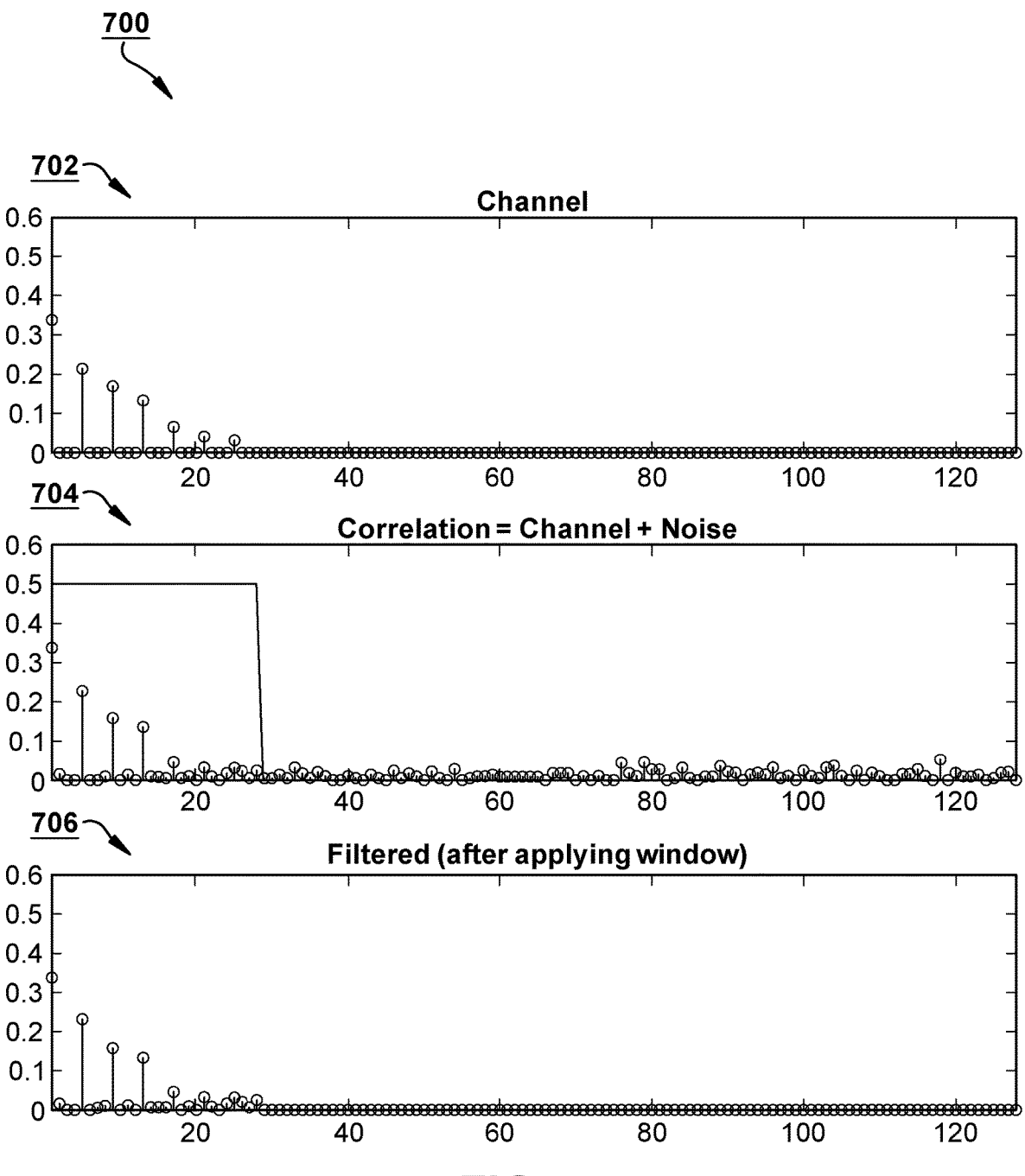
FIG. 7 illustrates an example of filtering using a chosen window for experienced conditions, and that can facilitate windowing in channel estimation, in accordance with an embodiment of this disclosure.

FIG. 7 illustrates an example 700 of filtering using a chosen window for experienced conditions, and that can facilitate windowing in channel estimation, in accordance with an embodiment of this disclosure. In some examples, part(s) of example 700 can be used by part(s) of system architecture 100 of FIG. 1 to facilitate windowing in channel estimation.

Example 700 comprises channel 702, correlation=channel+noise 704, and filtered (after applying window) 706.

The following is an example of window width dependency on SNR. This example demonstrates how window width can be dependent on SNR conditions. The dynamic can be that, in higher SNR conditions, a noise level is lower, and it is possible to widen the window to take advantage of more data points overall, improving channel estimation despite introducing additional noise. While in low SNR conditions, since the noise level is higher, the tendency can be to narrow the window, compromising on weaker taps but benefiting from less noise.

The following are two examples that feature the same channel, but with different SNR levels, leading to different window widths. Each of these examples shows correlation/channel in delay and frequency domains. Each example figure (FIGS. 7-8) contains the following three sub-figures:

Ideal channel without noise for reference.
Correlation (noisy channel) which is an input to the model. Also indicated is a window to be applied based on model's output.
Channel estimation that is correlation after filtering.

FIG. 7 demonstrates a high SNR case. It can be seen that, in this example, the chosen window seeks to include all the channel taps.

Figure 8:
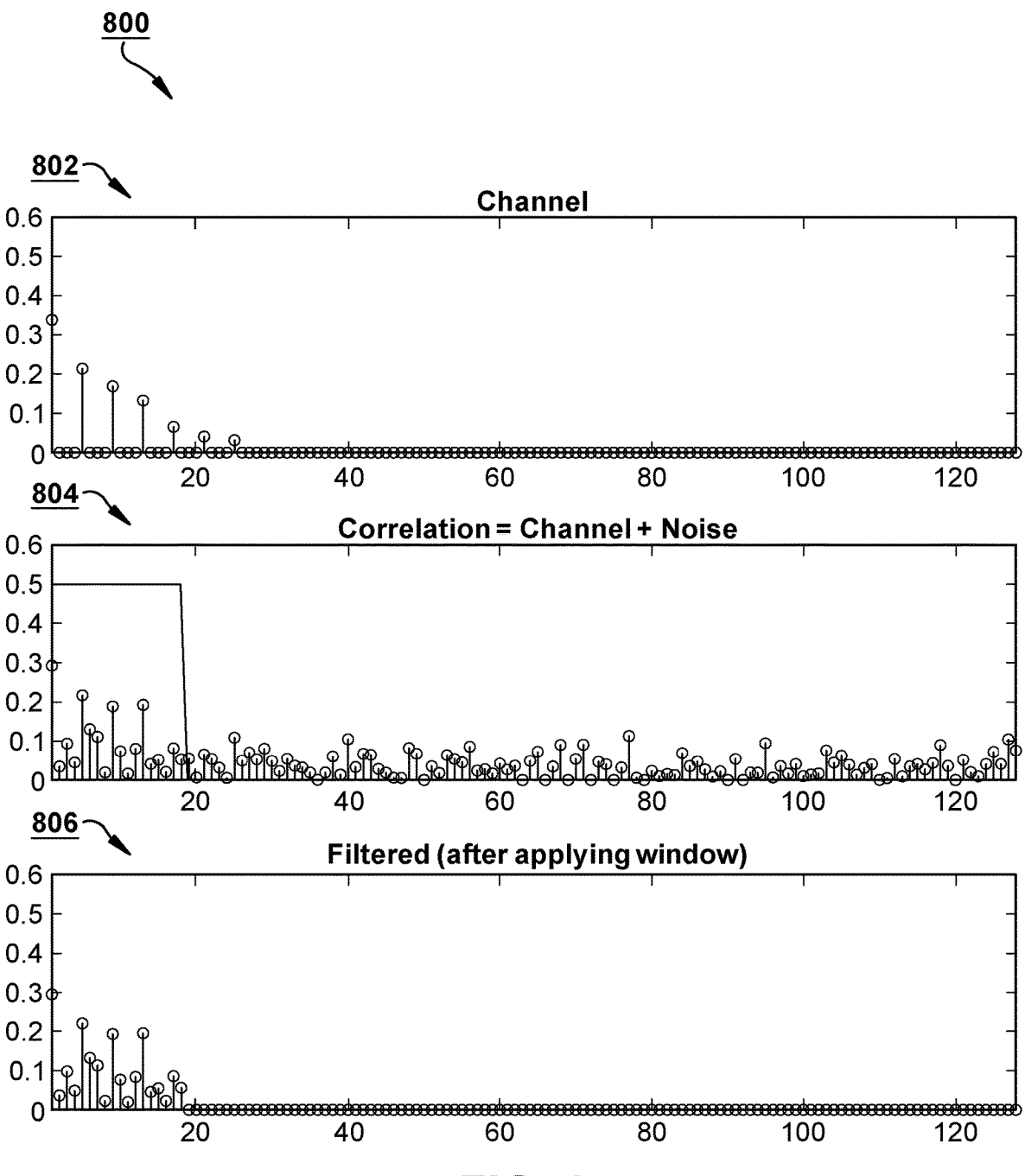
FIG. 8 illustrates another example of filtering using a chosen window for experienced conditions, and that can facilitate windowing in channel estimation, in accordance with an embodiment of this disclosure.

FIG. 8 illustrates another example 800 filtering using a chosen window for experienced conditions, and that can facilitate windowing in channel estimation, in accordance with an embodiment of this disclosure. In some examples, part(s) of example 800 can be used by part(s) of system architecture 100 of FIG. 1 to facilitate windowing in channel estimation.

Example 800 comprises channel 802, correlation=channel+noise 804, and filtered (after applying window) 806.

FIG. 8 demonstrates a low SNR case. It can be seen that in these conditions, the chosen window does not include all the taps, but only the stronger ones, dropping two weak taps as a result. As a result, in frequency domain the resulting channel is smother compared to the example of FIG. 7.

In contrast to the wider window of the high SNR example of FIG. 7, FIG. 7 has a narrower window in its low SNR example.

Example Process Flows

FIG. 9 illustrates an example process flow 900 for windowing in channel estimation, in accordance with an embodiment of this disclosure. In some examples, one or more embodiments of process flow 900 can be implemented by system architecture 100 of FIG. 1, or computing environment 1200 of FIG. 12.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of process flow 1000 of FIG. 10, and/or process flow 1100 of FIG. 11.

Process flow 900 begins with 902, and moves to operation 904.

Operation 904 depicts inputting a group of correlation vectors to a trained machine learning model, wherein a number of correlation vectors of the group of correlation vectors corresponds to a number of antennas of a group of antennas, and wherein respective correlation vectors of the group of correlation vectors comprise respective least squares channel estimations that are processed by respective inverse fast Fourier transforms and that correspond to respective antennas of the group of antennas. That is, an input to a machine learning model can be N correlation vectors, where N is the number of Tx-Rx links. A correlation vector can be output from a least squares estimation followed by an inverse fast Fourier transform.

In some examples, the inputting to the trained machine learning model comprises inputting a last-used window configuration for the broadband cellular communications.

In some examples, the inputting to the trained machine learning model comprises inputting an amount of time elapsed since a most-recent time that a channel of the broadband cellular communications was observed.

In some examples, the inputting to the trained machine learning model comprises inputting a noise variance estimation.

In some examples, the inputting to the trained machine learning model comprises inputting a classification of a channel of the broadband cellular communications as being line-of-sight or as being non-line-of-sight.

In some examples, the inputting to the trained machine learning model comprises inputting a synchronization accuracy.

In some examples, the inputting to the trained machine learning model comprises inputting a classification of a channel profile of the broadband cellular communications as being a macro cell or as being a micro cell.

In some examples, the inputting to the trained machine learning model comprises inputting a classification of a channel profile of the broadband cellular communications as being a macro cell or as being a micro cell.

In some examples, the inputting to the trained machine learning model comprises inputting a classification of a channel profile of the broadband cellular communications as being in an urban area or as being in a rural area.

In some examples, the inputting to the trained machine learning model comprises inputting a classification of a channel profile of the broadband cellular communications that identifies a carrier frequency.

That is, there can be optional contextual information used as input to the trained learning model, and this contextual information can include a last used window configuration, an amount of time that elapsed since this channel was last observed, a noise variance estimation, a channel LOS/NLOS classification, a synchronization accuracy, and a channel profile such as, micro/macro cell, urban/rural area, and/or carrier frequency.

After operation 904, process flow 900 moves to operation 906.

Operation 906 depicts, as a result of the inputting, obtaining an output of the trained machine learning model, wherein the output identifies a window size, a window position, and a window shape. That is, an output of the machine learning model of operation 904 can comprise a preferred window configuration index out of finite set of possibilities representing a triplet of the following parameters: S: window shape index, W: window size, P: window position.

After operation 906, process flow 900 moves to operation 908.

Operation 908 depicts conducting broadband cellular communications with at least one user equipment based on the window size, the window position, and the window shape. That is, the window configuration identified in operation 904 can be used in communicating with a UE.

After operation 908, process flow 900 moves to 910, where process flow 900 ends.

FIG. 10 illustrates another example process flow 1000 for windowing in channel estimation, in accordance with an embodiment of this disclosure. In some examples, one or more embodiments of process flow 1000 can be implemented by system architecture 100 of FIG. 1, or computing environment 1200 of FIG. 12.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of process flow 900 of FIG. 9, and/or process flow 1100 of FIG. 11.

Process flow 1000 begins with 1002, and moves to operation 1004.

Operation 1004 depicts, as part of facilitating broadband cellular communications with at least one user equipment using a group of antennas, processing a group of correlation vectors with a trained machine learning model to produce an output, wherein a number of correlation vectors of the group of correlation vectors corresponds to a number of antennas of the group of antennas, wherein respective correlation vectors of the group of correlation vectors comprise respective least squares channel estimations that are processed by respective inverse fast Fourier transforms and that correspond to respective antennas of the group of antennas, and wherein the output identifies a window configuration. In some examples, operation 1004 can be implemented in a similar manner as operations 904-906 of FIG. 9.

In some examples, the window configuration comprises a window size, a window position, and a window shape. In some examples, the window configuration comprises a one-hot vector. That is, an index can be encoded in a one-hot vector.

In some examples, the output comprises a noise variance estimation. That is, an output can comprise a refined noise variance estimation.

After operation 1004, process flow 1000 moves to operation 1006.

Operation 1006 depicts facilitating the broadband cellular communications with the user equipment based on the window configuration. In some examples, operation 1006 can be implemented in a similar manner as operation 908 of FIG. 9.

After operation 1006, process flow 1000 moves to 1008, where process flow 1000 ends.

FIG. 11 illustrates another example process flow 1100 for windowing in channel estimation, in accordance with an embodiment of this disclosure. In some examples, one or more embodiments of process flow 1100 can be implemented by system architecture 100 of FIG. 1, or computing environment 1200 of FIG. 12.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of process flow 900 of FIG. 9, and/or process flow 1000 of FIG. 10.

Process flow 1100 begins with 1102, and moves to operation 1104.

Operation 1104 depicts, as part of broadband cellular communications with at least one user equipment using antennas of the system, inputting correlation vectors to a trained machine learning model to produce an output, wherein respective correlation vectors of the correlation vectors comprise respective least squares channel estimations that correspond to respective antennas of the antennas, and wherein the output identifies a window configuration. In some examples, operation 1104 can be implemented in a similar manner as operations 904-906 of FIG. 9.

In some examples, operation 1104 comprises adjusting the window configuration while conducting the broadband cellular communications with the user equipment. That is, the present techniques can be implemented to dynamically decide on an optimal (or satisfactory) window size, position, and shape to cater to the experienced channel conditions.

In some examples, the trained machine learning model was trained with a dataset of channel information generated by a digital twin. That is, a dataset for training the machine learning model can be generated based on channel estimation, such as with a digital twin, which comprises a digital model of a base station.

In some examples, the trained machine learning model was trained with data that is labeled with predefined window configurations. In some examples, the trained machine learning model was trained with data that is labeled with channel estimation mean square errors for window configurations. In some examples, the trained machine learning model was trained with data that is labeled with window configurations that satisfy a minimal mean square error criterion. That is labeling training data can be based on applying filtering using all predefined window configurations; determining channel estimation MSE values for all window configurations; and/or assigning labels representing window configurations that minimize MSE.

After operation 1104, process flow 1100 moves to operation 1106.

Operation 1106 depicts conducting the broadband cellular communications with the user equipment based on in accordance with the window configuration. In some examples, operation 1106 can be implemented in a similar manner as operation 908 of FIG. 9.

After operation 1106, process flow 1100 moves to 1108, where process flow 1100 ends.

Example Operating Environment

In order to provide additional context for various embodiments described herein, FIG. 12 and the following discussion are intended to provide a brief, general description of a suitable computing environment 1200 in which the various embodiments of the embodiment described herein can be implemented.

For example, parts of computing environment 1200 can be used to implement one or more embodiments of base station 102 and/or UEs 104 of FIG. 1.

In some examples, computing environment 1200 can implement one or more embodiments of the process flows of FIGS. 9-11 to facilitate windowing in channel estimation.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a nonvolatile storage such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are examples, and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1216 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/ output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/ communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
at least one processor; and
at least one memory that stores executable instructions that, when executed by the at least one processor, facilitate performance of operations, comprising:
inputting a group of correlation vectors to a trained machine learning model, wherein a number of correlation vectors of the group of correlation vectors corresponds to a number of antennas of a group of antennas, and wherein respective correlation vectors of the group of correlation vectors comprise respective least squares channel estimations that are processed by respective inverse fast Fourier transforms and that correspond to respective antennas of the group of antennas;
as a result of the inputting, obtaining an output of the trained machine learning model, wherein the output identifies a window size, a window position, and a window shape; and
conducting broadband cellular communications with at least one user equipment based on the window size, the window position, and the window shape.

2. The system of claim 1, wherein the inputting to the trained machine learning model comprises inputting a last-used window configuration for the broadband cellular communications.

3. The system of claim 1, wherein the inputting to the trained machine learning model comprises inputting an amount of time elapsed since a most-recent time that a channel of the broadband cellular communications was observed.

4. The system of claim 1, wherein the inputting to the trained machine learning model comprises inputting a noise variance estimation.

5. The system of claim 1, wherein the inputting to the trained machine learning model comprises inputting a classification of a channel of the broadband cellular communications as being line-of-sight or as being non-line-of-sight.

6. The system of claim 1, wherein the inputting to the trained machine learning model comprises inputting a synchronization accuracy.

7. The system of claim 1, wherein the inputting to the trained machine learning model comprises inputting a classification of a channel profile of the broadband cellular communications as being a macro cell.

8. The system of claim 1, wherein the inputting to the trained machine learning model comprises inputting a classification of a channel profile of the broadband cellular communications as being a micro cell.

9. The system of claim 1, wherein the inputting to the trained machine learning model comprises inputting a classification of a channel profile of the broadband cellular communications as being in an urban area or as being in a rural area.

10. The system of claim 1, wherein the inputting to the trained machine learning model comprises inputting a classification of a channel profile of the broadband cellular communications that identifies a carrier frequency.

11. A method, comprising:
as part of facilitating broadband cellular communications with at least one user equipment using a group of antennas, processing, by a system comprising at least one processor, a group of correlation vectors with a trained machine learning model to produce an output, wherein a number of correlation vectors of the group of correlation vectors corresponds to a number of antennas of the group of antennas, wherein respective correlation vectors of the group of correlation vectors comprise respective least squares channel estimations that are processed by respective inverse fast Fourier transforms and that correspond to respective antennas of the group of antennas, and wherein the output identifies a window configuration; and
facilitating, by the system, the broadband cellular communications with the user equipment based on the window configuration.

12. The method of claim 11, wherein the window configuration comprises a window size, a window position, and a window shape.

13. The method of claim 12, wherein the window configuration comprises a one-hot vector.

14. The method of claim 11, wherein the output comprises a noise variance estimation.

15. A non-transitory computer-readable medium comprising instructions that, in response to execution, cause a system comprising at least one processor to perform operations, comprising:
as part of broadband cellular communications with at least one user equipment using antennas of the system, inputting correlation vectors to a trained machine learning model to produce an output, wherein respective correlation vectors of the correlation vectors comprise respective least squares channel estimations that correspond to respective antennas of the antennas, and wherein the output identifies a window configuration; and
conducting the broadband cellular communications with the user equipment based on in accordance with the window configuration.

16. The non-transitory computer-readable medium of claim 15, wherein the operations further comprise:
adjusting the window configuration while conducting the broadband cellular communications with the user equipment.

17. The non-transitory computer-readable medium of claim 15, wherein the trained machine learning model was trained with a dataset of channel information generated by a digital twin.

18. The non-transitory computer-readable medium of claim 15, wherein the trained machine learning model was trained with data that is labeled with predefined window configurations.

19. The non-transitory computer-readable medium of claim 15, wherein the trained machine learning model was trained with data that is labeled with channel estimation mean square errors for window configurations.

20. The non-transitory computer-readable medium of claim 15, wherein the trained machine learning model was trained with data that is labeled with window configurations that satisfy a minimal mean square error criterion.

* * * * *